United States Patent
Badger et al.

(10) Patent No.: US 9,925,401 B2
(45) Date of Patent: Mar. 27, 2018

(54) CELLULAR GLASS SYSTEM FOR SUPPRESSION OF VAPORIZATION, FIRE AND THERMAL RADIATION FROM LIQUID HYDROCARBONS

(71) Applicant: PITTSBURGH CORNING CORPORATION, Pittsburgh, PA (US)

(72) Inventors: Steven Robert Badger, Pittsburgh, PA (US); Brandon Alan Stambaugh, Export, PA (US)

(73) Assignee: Pittsburgh Corning Corporation, Plttsburg, PA (US)

( * ) Notice: Subject to any disclaimer, the term of this patent is extended or adjusted under 35 U.S.C. 154(b) by 0 days.

(21) Appl. No.: 15/026,641

(22) PCT Filed: Oct. 2, 2014

(86) PCT No.: PCT/US2014/058801
§ 371 (c)(1),
(2) Date: Apr. 1, 2016

(87) PCT Pub. No.: WO2015/065645
PCT Pub. Date: May 7, 2015

(65) Prior Publication Data
US 2016/0250505 A1    Sep. 1, 2016

Related U.S. Application Data

(60) Provisional application No. 61/885,831, filed on Oct. 2, 2013.

(51) Int. Cl.
| | | |
|---|---|---|
| A62C 3/06 | (2006.01) | |
| A62C 2/06 | (2006.01) | |
| C03C 11/00 | (2006.01) | |

(52) U.S. Cl.
CPC ............... A62C 3/065 (2013.01); A62C 2/06 (2013.01); C03C 11/00 (2013.01)

(58) Field of Classification Search
CPC .............. A62C 2/06; A62C 3/06; C03C 11/00
(Continued)

(56) References Cited

U.S. PATENT DOCUMENTS 2,205,534 A * 6/1940 Lytle ................... E04C 2/296
                                                              181/285
2,437,125 A * 3/1948 Plummer ............. B65D 88/46
                                                              220/221

(Continued)

FOREIGN PATENT DOCUMENTS

CN          203113446        8/2013

OTHER PUBLICATIONS

International Search Report and Written Opinion of PCT/US14/58801 dated Jan. 7, 2015.

*Primary Examiner* — Viet Le
(74) *Attorney, Agent, or Firm* — Calfee, Halter & Griswold LLP (57) ABSTRACT

A passive fire suppression system including at least one tapered cellular glass block and having a cap with a tapered shape disposed on the top of the at least one cellular glass block. The passive fire suppression system allows drainage from the upper surface to the bottom of the system. The drainage is beneficial for both environmental conditions such as rain as well as for incidents where combustible liquids are spilled on the top surface of the system. Therefore, the system will not only shield any combustible materials that are under the system but will also quickly drain any combustible liquids that may spill onto the top of the system to the lower surface.

14 Claims, 7 Drawing Sheets

(58) Field of Classification Search
USPC .......................................................... 169/48
See application file for complete search history.

(56) References Cited

U.S. PATENT DOCUMENTS

| | | | |
|---|---|---|---|
| 5,845,443 A | 12/1998 | Wirkus et al. | |
| 6,155,015 A * | 12/2000 | Kirby | E04H 4/1236 |
| | | | 264/271.1 |
| 8,181,287 B2 * | 5/2012 | Luxton | A47K 3/40 |
| | | | 4/613 |
| 2006/0168906 A1 | 8/2006 | Tonyan et al. | |
| 2012/0018178 A1 * | 1/2012 | Stambaugh | A62C 3/065 |
| | | | 169/46 |
| 2014/0102734 A1 | 4/2014 | Stuck et al. | |
| 2014/0137487 A1 | 5/2014 | Mackintosh | |

* cited by examiner

CELLULAR GLASS SYSTEM FOR SUPPRESSION OF VAPORIZATION, FIRE AND THERMAL RADIATION FROM LIQUID HYDROCARBONS

CROSS-REFERENCE TO RELATED APPLICATION

This application is a United States national stage of International Application No. PCT/US14/58801, filed Oct. 2, 2014, which published as International Publication No. WO 2015/065645, and which claims the benefit under 35 U.S.C. § 119(e) of the earlier filing date of U.S. Provisional Patent Application No. 61/885,831 filed on Oct. 2, 2013, the disclosure of which is incorporated by reference herein.

BACKGROUND

Hydrocarbon fires are dangerous and often disastrous industrial events. Depending on the type of fuel, these fires can reach extremely high temperatures, and result in spillage, spreading of burning materials, catastrophic damage to equipment, and potential harm to human life.

Cellular glass can be applied to areas designed to contain hydrocarbon spills passively before the ignition event to suppress vapors, fire, and to reduce the thermal radiation from hydrocarbon fires. This suppression can increase the amount of time one has to deploy firefighting measures, potentially saving lives and damage to adjacent equipment.

The use of cellular glass as a thermal insulating material is well known. Cellular glass is an inorganic, closed-cell material with high resistance to fire, moisture, vermin and mold growth. Cellular glass has been made in the past by processes disclosed in a number of patents, such as U.S. Pat. Nos. 2,255,238, 2,322,581, and 2,156,457. This prior art illustrates the making of cellular glass blocks for thermal insulation. As one of ordinary skill in the art is aware, the process includes mixing powdered glass material with a cellulating agent and partially filling a mold with the powdery mixture. The mold is heated until the powdery mixture softens, coalesces and the cellulating agent reacts to cellulate in the mixture to produce a bun of cellular glass. The bun is then annealed and cut or trimmed into a desired shape. In other methods of production, the cellular glass is allowed to rapidly cool to produce an aggregate-like product.

Cellular glass has many desirable properties, including dimensional stability, low density, low thermal conductivity, and high compressive strength. Since cellular glass is inorganic and made primarily from glass, it has a natural ability to attenuate thermal radiation and resist fire for extended periods of time. Cellular glass is specified on many industrial applications, such as pipe and vessel insulation, as well as in many building insulation applications. The cellular glass insulation properties are due in part to the ability of cellular glass to resist fire and protect equipment from thermal damage. Since cellular glass is closed-cell and lightweight, it is buoyant on most liquids including water, liquid natural gas (LNG) and oils. During World War II, for example, cellular glass was used to float nets in harbors to prevent enemy submarines from entering freely. More recently, the buoyancy and fire resistant properties of cellular glass have made it an ideal component for oil boilover and fire suppression systems.

Cellular glass has been utilized in various applications, such as pipe and vessel insulation, to limit damage to mechanical systems as a result of fires. These are largely protective measures against external thermal events that have the potential to damage unprotected equipment, and are not used to attenuate hydrocarbon fires, limit thermal radiation from hydrocarbon fires, and reduce vaporization/risk of ignition of hydrocarbons.

Accordingly, embodiments of the invention use cellular glass to provide an improved product and methods, to attenuate fires from flammable liquids, limit thermal radiation from the fires, and reduce vaporization/risk of ignition of hydrocarbons.

In accordance with the present invention, there is provided a method of controlling a hydrocarbon fire, limiting thermal radiation from a hydrocarbon fire, and reducing vaporization/risk of ignition using cellular glass.

Cellular glass blocks are deployed passively, prior to an ignition event to provide control. An embodiment of this invention includes the direct placement of cellular glass within the areas designed to contain hydrocarbon spills. Therefore, the product could be used to provide safety for liquids such as LNG, LPG, or any other related flammable liquid.

A buoyant glass product dispersed on the surface of a hydrocarbon fire will lower the risks associated with a fire. While the old system used small cubes/pieces of cellular glass, the present system gives 1) better coverage over the flammable liquid which will make it very difficult to catch fire and 2) the shape/top coating is important for both drainage and to allow for general maintenance work. In particular, cellular glass has the following advantageous properties:

- It is "solid foam" that acts as a floating barrier to insulate a burning liquid surface.
- It is a non-flammable material.
- Cellular glass floats on most flammable liquid pool surfaces. It remains independent of the amount of pool depth, and creates constant coverage when applied correctly.
- It has a completely closed cell structure; as a result, no liquids are absorbed during contact.
- The structure is stable at flame temperature, and no reapplication or further coverage maintenance is generally required.
- It is waterproof, impervious to water vapour, acid resistant and is easily cut to shape. It has high compressive strength, and is also dimensionally stable.
- Cellular glass can be easily arranged to take the shape of desired coverage area.

Testing has demonstrated that the cellular glass material reduces significantly the radiation flux received by external targets and observers when compared to a hydrocarbon fire without the material being applied. This was shown from radiometers deployed around a test base filled with hydrocarbons. During the test with the cellular glass blocks, both visual and radiometer observations confirmed that the severity of burning was reduced greatly with flame height and volume significantly less than for a free-burning hydrocarbon fire; consequently, thermal feedback to the fire was lessened which delayed or even stopped combustion altogether. While heat transferred through the uppermost layers of the fuel, penetration was minimal when compared to the equivalent test without the cellular glass material.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION

It is to be understood that the figures and descriptions of the present invention have been simplified to illustrate elements that are relevant for a clear understanding of the invention. The detailed description will be provided herein below with reference to the attached drawings.

This invention relates to a method for using cellular glass blocks to suppress the vaporization, fire, and thermal radiation from liquid hydrocarbons. Cellular glass blocks are deployed passively, prior to an ignition event to provide control and reduce risk. While the descriptions herein focus on hydrocarbon fires, one of ordinary skill in the art would understand that these methods could be applied not only to liquid hydrocarbons but also to all other flammable materials.

Cellular glass is a material composed primarily of glass that contains a significant number of completed closed bubbles in the material to form a lower density material than a solid glass product. Cellular glass may generally range in density from three pounds per cubic foot up to the density of the fuel in which it will ultimately need to float (which will vary). The greater the difference between the density of cellular glass and that of the oil, the more buoyant the cellular glass system will be, and the greater the protection the system will provide.

Cellular glass will be closed celled, so that fuel absorption will not result in premature system failure due to the cellular glass sinking in fuel. Cellular glass may be in block, sheet, in flat or preferably tapered configurations. Individual blocks preferably are no more than a few feet in length or width and no more than twelve inches thick. According to embodiments of the invention, multiple blocks may be constructed into large sheets using adhesive or mechanical fasteners, or specifically fabricated to be located within a containment spill area.

According to embodiments of the invention, cellular glass is provided with a surface coating used to improve weatherability and fire control. These coatings can include, but are not limited to, metals, UV resistant polymers, and/or intumescent materials. Metal, for example, is not flammable, allows workers to walk on the surface, and creates a simple method for environmental protection.

A passive fire suppression system according to embodiments of the invention is shown in FIGS. 1a to 3e. The passive fire suppression system allows drainage from the upper surface to the bottom of the system. The drainage design is beneficial for both environmental conditions such as rain as well as for incidents where combustible liquids are spilled on the top surface of the system. Therefore, this design will not only shield any combustible materials that are under the system but will also quickly drain any combustible liquids that may spill onto the top of the system to the lower surface. Therefore, the passive system design is ideal for any application ranging from large LNG spill containment pits to small containment vessels for spillage from intermediate bulk containers (IBCs).

According to embodiments of the invention, the passive fire suppression system utilizing tapered cellular glass blocks may be capped with metal such as thin gauge aluminum or stainless steel. The tapered blocks allow spilled flammable liquids to more readily flow below the surface of the cellular glass. Tapered in this application refers to a configuration wherein two surfaces slope downwardly away from a midline having an upper height to a lower height. The capped system may be either a large sheet to cover multiple blocks or individual block-sized caps. Metal, for example, is not flammable, allows workers to walk on the surface, and creates a simple method for environmental protection. The metal can be attached to the cellular glass blocks using adhesive or sealant to ensure that flammable materials are not trapped between the materials.

Figure 1A:
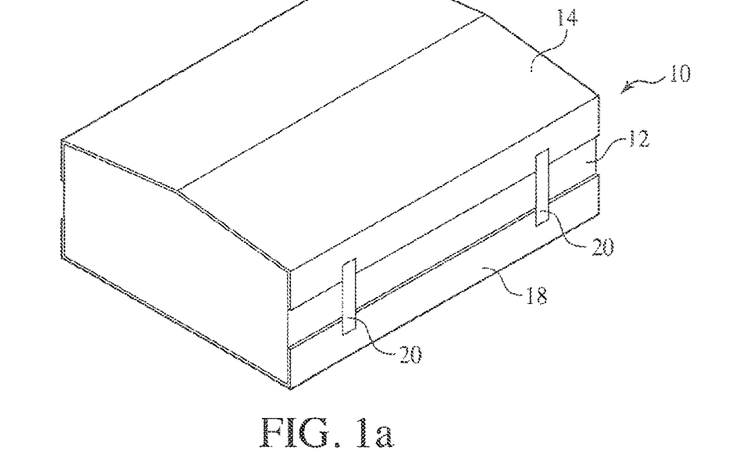
FIGS. 1a, 1b and 1c show perspective, end and side views, respectively, of an individual module formed from a cellular glass block with a metallic cap.
Figure 1B:
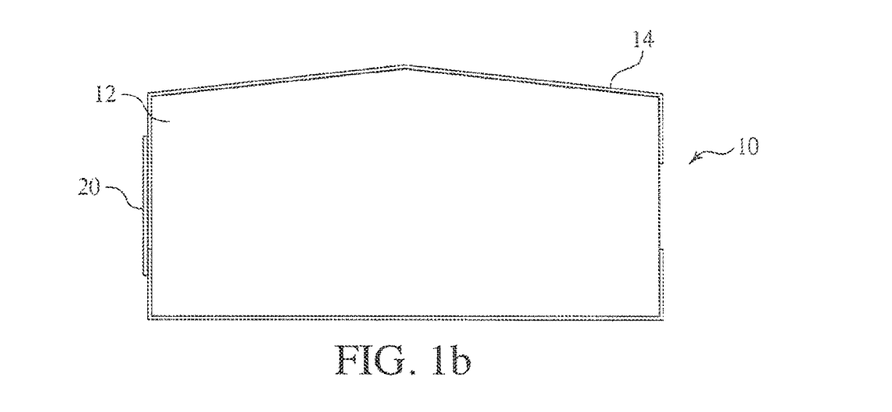
Figure 1C:
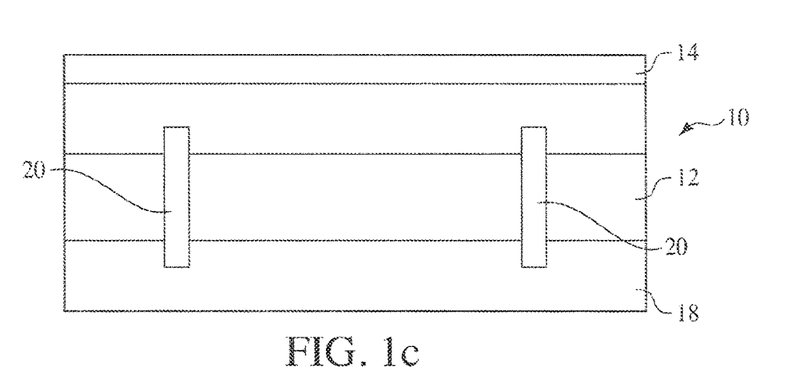
Figure 1D:
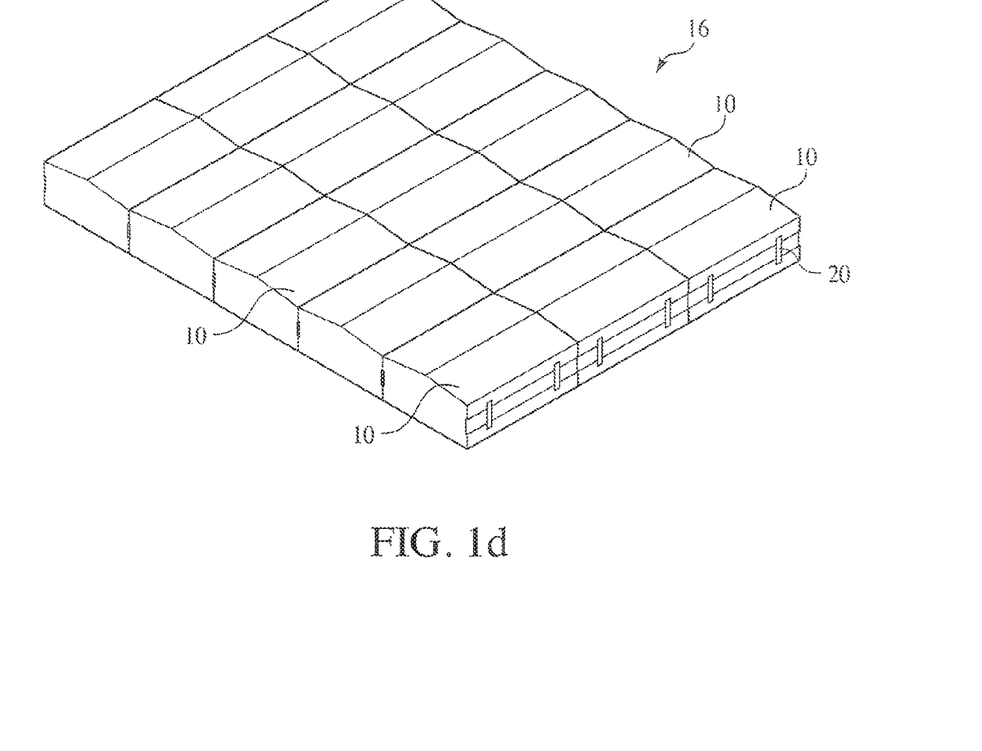
FIGS. 1d and 1e show perspective and side views having individual modules fitted together.
Figure 1E:
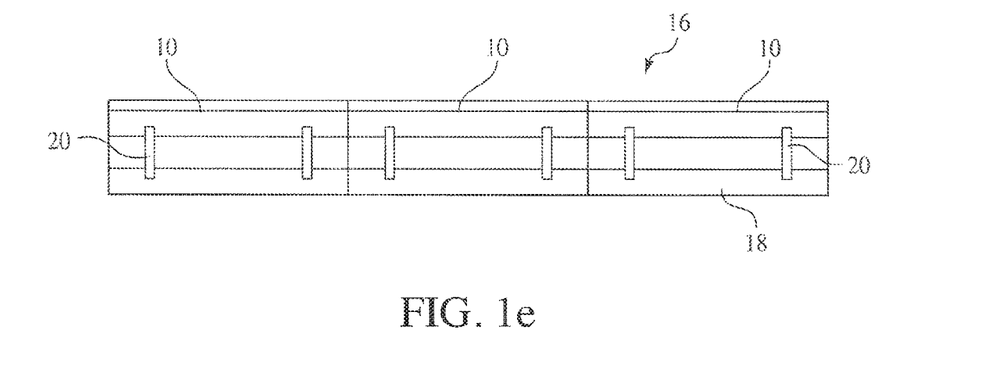

As shown in FIGS. 1a-1e, embodiments of the invention include the use of a metallic surface to assist with drainage and to also provide protection from the environment or from activities on the surface such as snow removal. FIGS. 1a-1c shows an individual module 10 formed from a cellular glass block 12 with a cap 14. FIGS. 1d-1e show an embodiment having individual modules 10 fitted together to create a continuous sheet of modules 16. As shown in FIGS. 1a and 1c-1e, a bottom base 18 underneath each cellular glass block 12 is preferably attached to the cap 14 with connector strips 20. Cap 14, bottom base 18 and connector strips 20 are preferably metallic. A bottom base 18 with connector strips 20 may be used in the embodiments described below as well. In this embodiment and the embodiments discussed below, individual modules may have a single layer or multiple layers of cellular glass.

Figure 2A:
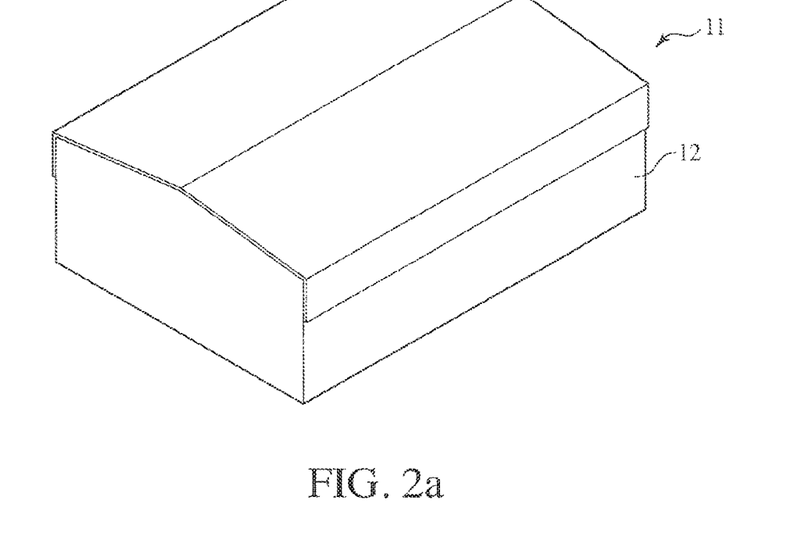
FIG. 2a shows an individual module formed from a cellular glass block with a metallic cap.
Figure 2B:
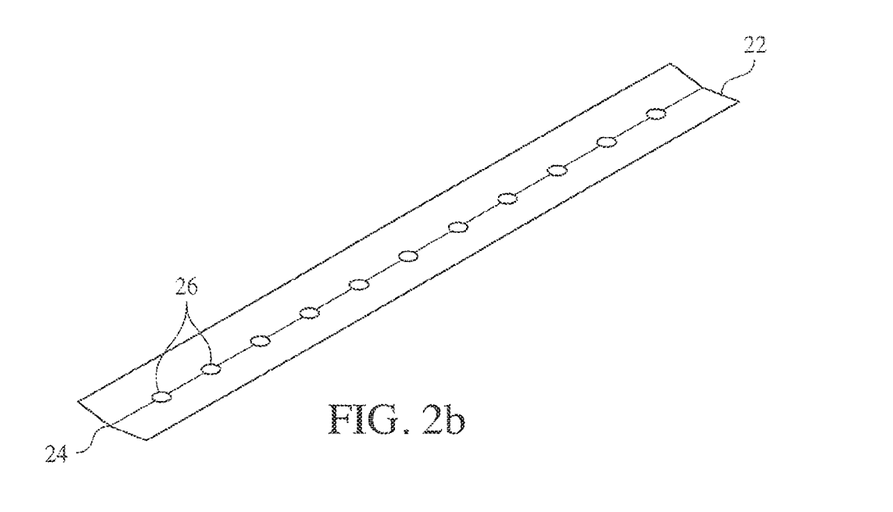
FIG. 2b shows a self-draining connector having holes.
Figure 2C:
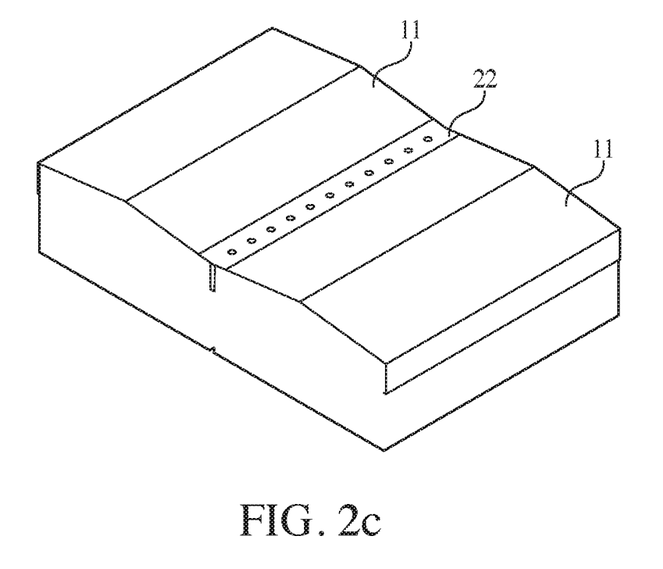
FIGS. 2c and 2d show perspective and top views, respectively, of two individual modules connected together with self-draining connector.
Figure 2D:
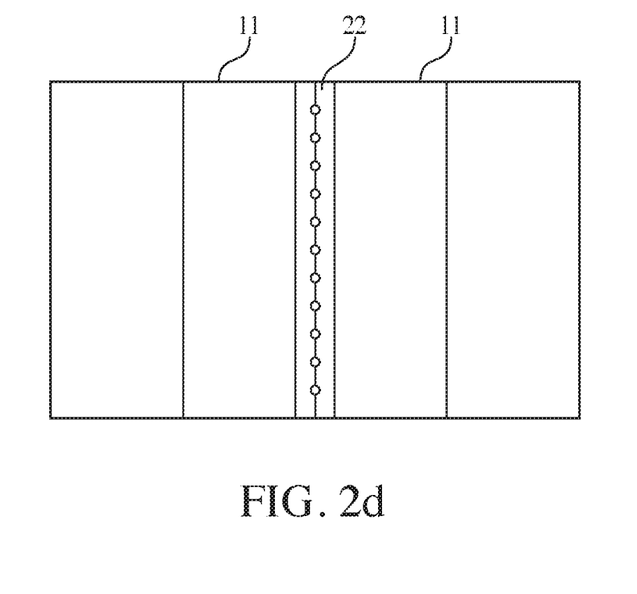
Figure 2E:
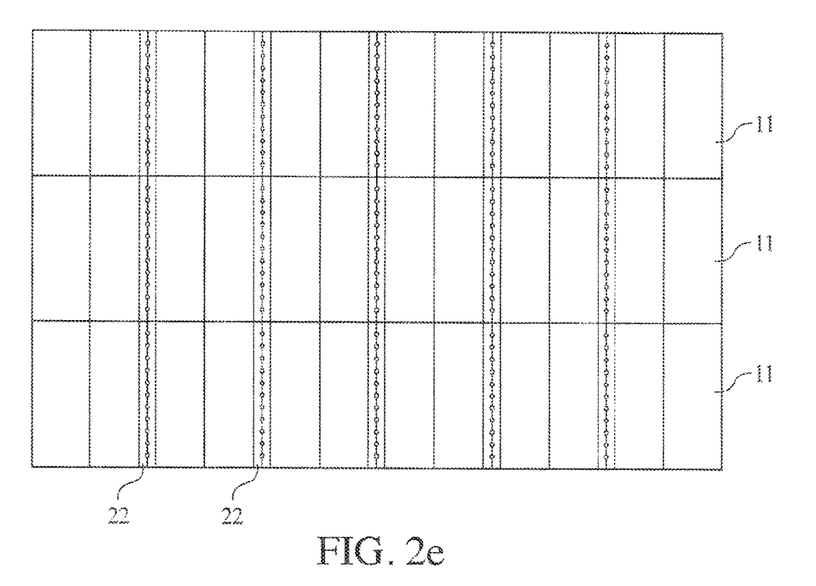
FIGS. 2e and 2f show top and perspective views, respectively, of multiple modules connected together with self-draining connector.
Figure 2F:
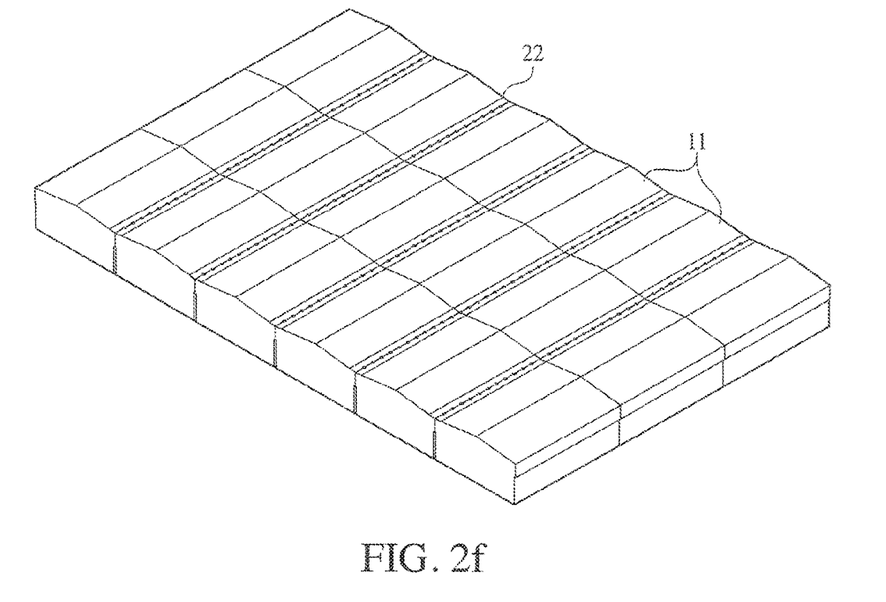
Figure 3A:
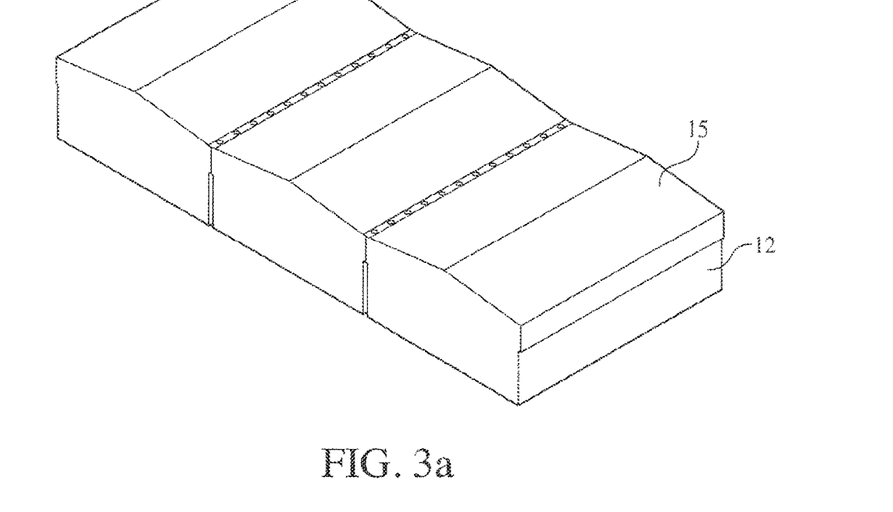
FIGS. 3a, 3b and 3c show perspective, side and top views, respectively, of individual cellular glass blocks having a continuous metallic sheet connecting a row of cellular glass blocks.
Figure 3B:
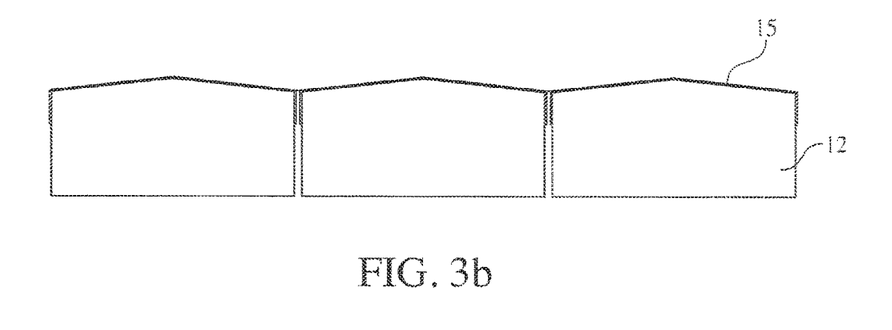
Figure 3C:
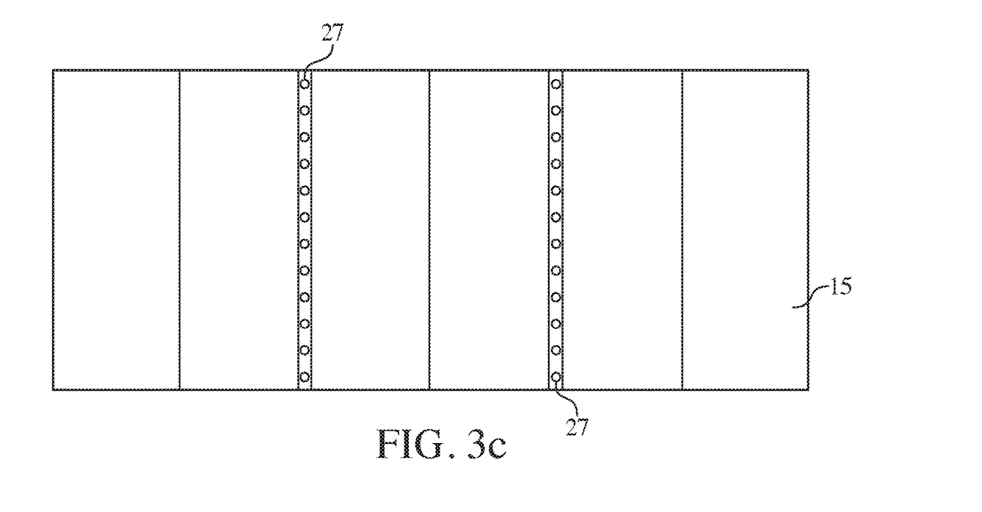
Figure 3D:
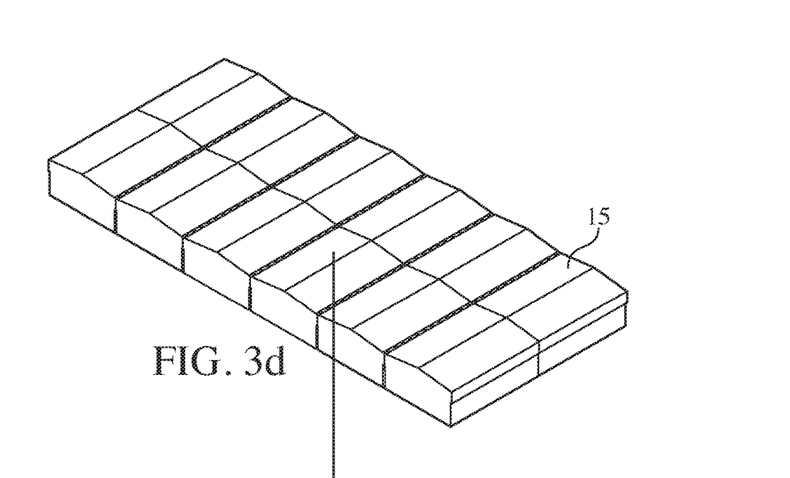
FIGS. 3d and 3e show perspective and close-up views, respectively, of two rows of individual cellular glass blocks like those shown in FIGS. 3a to 3c.
Figure 3E:
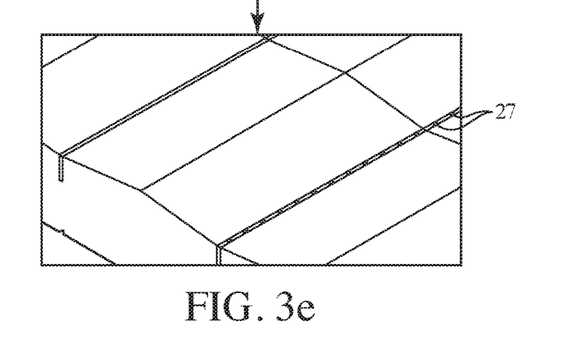

FIGS. 2a-2f illustrate an embodiment including a self-draining connector 22 to connect caps 14. FIG. 2a shows an individual module 11 formed from a cellular glass block with 12 a metallic cap 14. FIG. 2b shows the self-draining connector 22 which is rectangular in shape and tapers downwardly to its longitudinal midline 24 to encourage drainage through a plurality of holes 26 spaced along the midline 24. FIGS. 2c and 2d show two individual modules 11 connected together with self-draining connector 22. FIGS. 2e and 2f show multiple modules 11 connected together with self-draining connectors 22.

FIGS. 3a-3e show individual cellular glass blocks 12 having a continuous cap 15 connecting several cellular glass blocks 12. Cap 15 has a shape with alternating rows of tapers corresponding to rows of tapered glass blocks 12. Holes 27 in the cap 15 extend through the entire block to allow drainage to occur when fluids are drained from above the cellular glass blocks 12.

As shown above, embodiments of the invention known include the placement of the system to perform as passive protection. With passive deployment, a buoyant cellular glass material is placed in an area designed to contain hydrocarbon spills prior to an ignition event, where it will stay until such time as a spill occurs. The cellular glass will float on the surface of the fuel, thus reducing vaporization/risk of ignition, hydrocarbon fire, and limiting thermal radiation from the fire. Examples of how the passive fire suppression system according to embodiments of the invention may be utilized are as follows:

The passive fire suppression system is deployed in the area designed to contain hydrocarbon spills prior to ignition.

The passive fire suppression system may incorporate a system to keep the blocks from being placed directly on the bottom of a containment basin. An example may include metal brackets mounted directly into the blocks.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A passive fire suppression system for use with a liquid hydrocarbon fuel, the system comprising:
    at least one cellular glass block comprising cellular glass having a density of 3 lb/ft$^3$ to the density of the liquid hydrocarbon, the at least one cellular glass block having a top, a bottom, and a plurality of sides extending downwardly from the top, the top comprising at least two surfaces which slope from a midline having a first height downwardly to a second height;
    a cap disposed on the top of the at least one cellular glass block, covering the at least two surfaces of the top;
    wherein the passive fire suppression system is buoyant on the liquid hydrocarbon.

2. The passive fire suppression system of claim 1, further comprising a base disposed on the bottom of each of the at least one cellular glass block.

3. The passive fire suppression system of claim 2, further comprising at least one connector strip connecting the cap and the base.

4. The passive fire suppression system of claim 3, wherein the cap, base and at least one connector strip are metallic.

5. The passive fire suppression system of claim 1, wherein there is a cap on each of the at least one cellular glass blocks;
    further comprising a self-draining connector connecting adjacent caps, wherein the at least two surfaces slope downwardly from the first height to the self-draining connector at the second height.

6. The passive fire suppression system of claim 5, wherein each self-draining connector has a downwardly tapered shape with at least one drainage hole.

7. The passive fire suppression system of claim 1, where each cap covers a plurality of cellular glass blocks.

8. The passive fire suppression system of claim 7, where each cap has drainage holes.

9. The passive fire suppression system of claim 1, wherein the plurality of sides comprises at least two opposing sides extending from the second height to the bottom.

10. A passive fire suppression system for use with a liquid hydrocarbon fuel, the system comprising:
    a plurality of cellular glass blocks, the cellular glass blocks comprising cellular glass having a density of 3 lb/ft$^3$ to the density of the liquid hydrocarbon, having a top comprising at least two surfaces which slope from a midline having a first height downwardly to a second height;
    a cap disposed on the top of each cellular glass block, covering the at least two surfaces;
    a self-draining connector positioned at the second height between adjacent caps, the connector comprising a plurality of drainage holes arranged in a substantially linear fashion along a line defined by two adjacent glass blocks,
    wherein the passive fire suppression system is buoyant on the liquid hydrocarbon.

11. The passive fire suppression system of claim 10, further comprising a base disposed on the bottom of each of the at least one cellular glass block.

12. The passive fire suppression system of claim 11, further comprising at least one connector strip connecting the cap and the base.

13. The passive fire suppression system of claim 12, wherein the cap, base and at least one connector strip are metallic.

14. The passive fire suppression system of claim 9, wherein the cap covers a plurality of cellular glass blocks.

* * * * *